(12) United States Patent
Horikoshi

(10) Patent No.: US 8,264,647 B2
(45) Date of Patent: Sep. 11, 2012

(54) IMAGE DISPLAY APPARATUS AND OPTICAL COMPENSATION DEVICE

(75) Inventor: Ryoko Horikoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 273 days.

(21) Appl. No.: 12/395,990

(22) Filed: Mar. 2, 2009

(65) Prior Publication Data

US 2009/0244455 A1    Oct. 1, 2009

(30) Foreign Application Priority Data

Mar. 25, 2008    (JP) .................................. 2008-077401

(51) Int. Cl.
*G02F 1/13363*    (2006.01)
(52) U.S. Cl. ........................ 349/120; 349/119
(58) Field of Classification Search .................. 349/119, 349/120

See application file for complete search history.

(56) References Cited

U.S. PATENT DOCUMENTS

| 7,283,188 B2 * | 10/2007 | Su Yu et al. | 349/117 |
| 2005/0057714 A1 * | 3/2005 | Jeon et al. | 349/122 |
| 2008/0117385 A1 * | 5/2008 | Endo | 353/20 |

FOREIGN PATENT DOCUMENTS

| JP | 3162210 | 2/2001 |
| JP | 3864929 | 10/2006 |
| JP | 2007-286609 | 11/2007 |

* cited by examiner

*Primary Examiner* — Sarah Hahm
(74) *Attorney, Agent, or Firm* — SNR Denton US LLP

(57) ABSTRACT

An image display apparatus includes a liquid crystal panel having a liquid crystal layer disposed between a pair of substrates, and an optical compensation plate pair including a first optical compensation plate and a second optical compensation plate, the first optical compensation plate being formed of a negative uniaxial crystal and the second optical compensation plate being formed of a positive uniaxial crystal. The optical compensation plate pair is configured such that an optical phase difference caused by a difference in thickness between the first optical compensation plate and the second optical compensation plate cancels an optical phase difference generated by the liquid crystal panel.

10 Claims, 13 Drawing Sheets

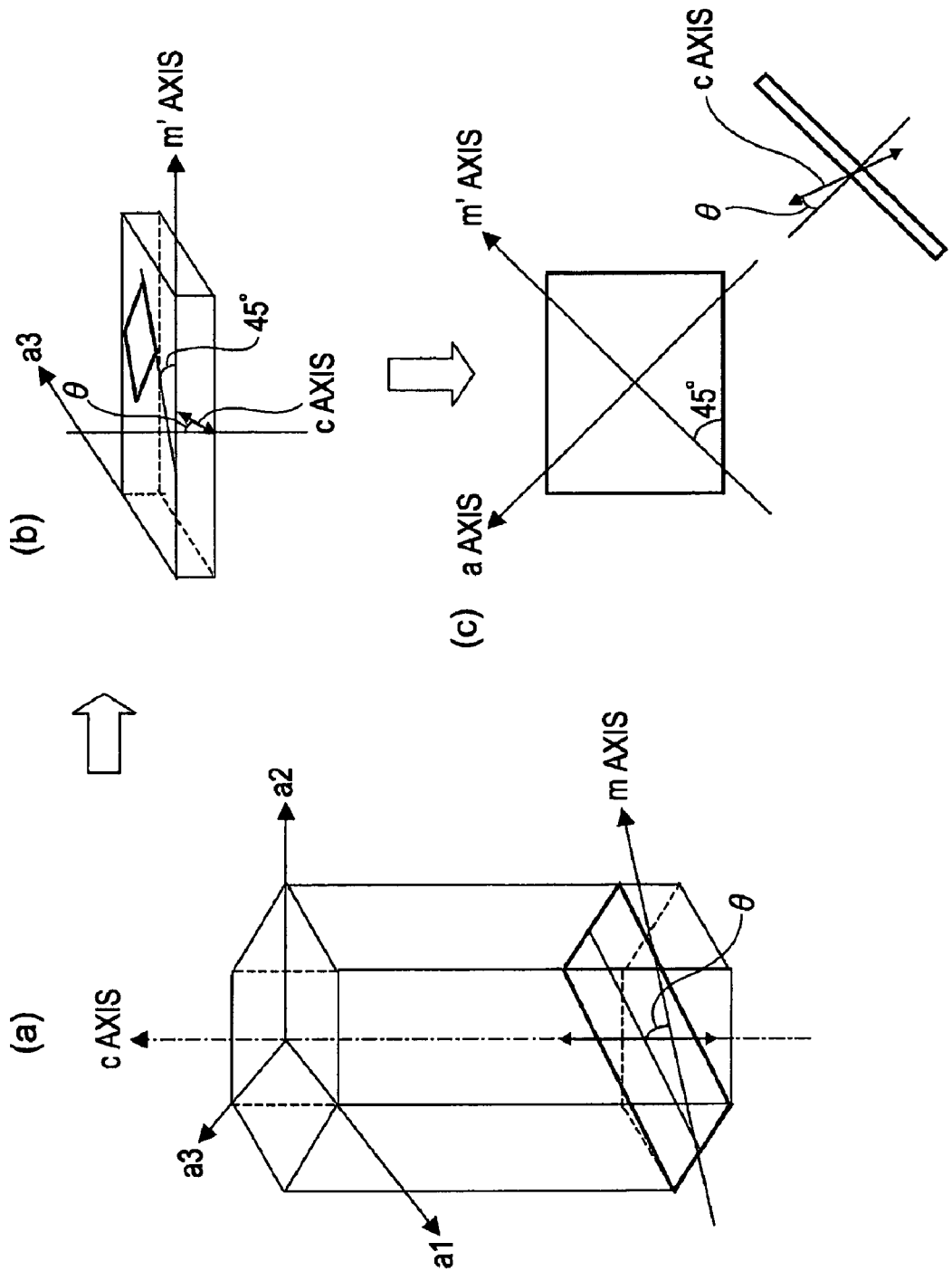

EQUAL CONTRAST RATIO CONTOUR

EQUAL CONTRAST RATIO CONTOUR

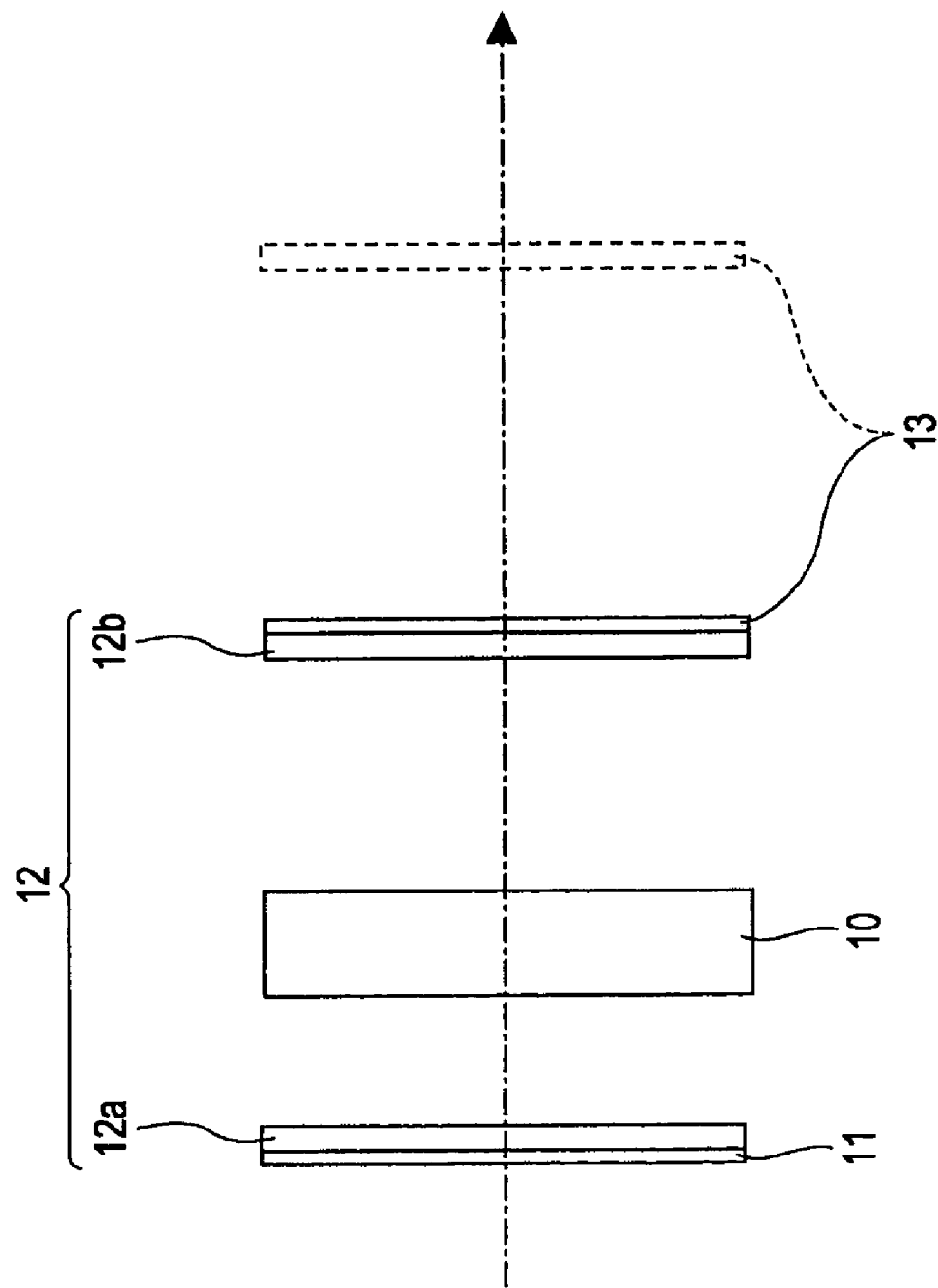

IMAGE DISPLAY APPARATUS AND OPTICAL COMPENSATION DEVICE

CROSS REFERENCES TO RELATED APPLICATIONS

The present invention contains subject matter related to Japanese Patent Application JP 2008-077401 filed in the Japanese Patent Office on Mar. 25, 2008, the entire contents of which are incorporated herein by reference.

BACKGROUND OF THE INVENTION

1. Field of the Invention

The present invention relates to an image display apparatus having a liquid crystal panel and to an optical compensation device used with the liquid crystal panel.

2. Description of the Related Art

Examples of image display apparatuses having a liquid crystal panel have been available. The examples of image display apparatuses include liquid crystal projector apparatuses in which the liquid crystal panel is used as an optical modulator. Liquid crystal projector apparatuses are configured to project an image modulated with a liquid crystal panel onto a screen, and are widely used as equipment for enlarging and projecting presentation material at meetings or lectures.

Improvement in the image quality of projected images is being demanded for liquid crystal projector apparatuses. One of important factors defining the quality of projected images is contrast. Contrast is the ratio in luminance between the black display state and the white display state.

In liquid crystal projector apparatuses, it is effective to minimize the luminance of a black display as much as necessary in order to improve the contrast. In actuality, however, certain factors such as the structure or nature of a liquid crystal panel serving as an optical modulator, and the state of light entering the liquid crystal panel from an illumination system may cause light leakage even in the black display state.

In order to prevent such light leakage, techniques used for optical compensation of the liquid crystal panel have been proposed. For example, multilayered thin films are used (see, for example, Japanese Patent No. 3162210), or a birefringent plate is used (see, for example, Japanese Patent No. 3864929). Alternatively, a plurality of birefringent members composed of a positive uniaxial birefringent material are used (see, for example, Japanese Unexamined Patent Application Publication No. 2007-286609).

SUMMARY OF THE INVENTION

Recently, vertical alignment (VA) liquid crystal, rather than twisted nematic (TN) liquid crystal widely used in the past, has been promoted to be used for liquid crystal panels of liquid crystal projector apparatuses. The VA liquid crystal is a type of liquid crystal that is aligned perpendicularly to a substrate when no voltage is applied and that is inclined with respect to the normal to the substrate when a voltage is applied. The VA liquid crystal exhibits characteristics of high speed and high contrast.

In the VA liquid crystal, the liquid crystal is aligned perpendicularly to a substrate when no voltage is applied, called "normally black", and no phase difference can occur for incident light perpendicular to a panel surface. In actuality, however, for some reason, the liquid crystal is aligned with a pretilt angle of about several degrees rather than aligned completely perpendicularly. This can cause a phase difference also for incident light perpendicular to the panel surface, resulting in light leakage. Incoming light from an illumination system also enters perpendicularly to the panel surface and is incident with a divergence angle spread corresponding to the F number of the light. This can also cause a phase difference, resulting in light leakage. In other words, even with the use of the VA liquid crystal, light leakage may occur in the black display state.

In a simulation, the VA liquid crystal with a certain thickness in which the liquid crystal is aligned with a pretilt angle can be modeled as an inclined positive C-plate. A possible mechanism used for optical compensation of the VA liquid crystal to prevent light leakage is that an optical compensation plate serving as a negative C-plate is arranged to be inclined in the same direction as that of the pretilt angle in the VA liquid crystal to cancel optical phase differences.

As disclosed in Japanese Patent No. 3162210, thin films are multilayered and act as an apparently negative C-plate to perform compensation. In this technique, the direction perpendicular to the surface of the thin films is the negative direction. When this technique is applied to the VA liquid crystal, it is necessary to arrange thin films to be inclined at a pretilt angle after forming the thin films. In this technique, it is assumed that the TN liquid crystal is used. Thus, it is difficult to apply the technique to the VA liquid crystal because of the difficulty in reducing the size of the apparatus (or reducing the space for the apparatus). Depending on the installation location, furthermore, astigmatism may occur.

In the technique disclosed in Japanese Patent No. 3864929 described above, it is also assumed that the TN liquid crystal is used. Thus, when the technique is applied to the VA liquid crystal, if birefringent members are arranged in directions where the individual characteristics allow cancellation of liquid crystal phase differences, a birefringent plate is as thin as about several tens of micrometers (μm). Thus, it may be difficult to form, process, and handle the birefringent plate.

In the technique disclosed in Japanese Unexamined Patent Application Publication No. 2007-286609 described above, it is assumed that the VA liquid crystal is used. However, it is necessary to use a plurality of optical compensation plates composed of a positive uniaxial crystal that is formed and processed into a thickness of about several tens of micrometers (μm). The formation and processing are difficult and are not advantageous in terms of cost.

In the techniques of the related art, therefore, both a compact apparatus configuration and ease of mass production (low-cost implementation) may not necessarily be achieved for the optical compensation of the liquid crystal panel.

It is therefore desirable to provide an image display apparatus and an optical compensation device which achieve increased contrast to provide the desired image quality, regardless of whether a liquid crystal panel is a TN liquid crystal panel or a VA liquid crystal panel, by using optical compensation of the liquid crystal panel while ensuring a compact apparatus configuration and ease of mass production.

According to an embodiment of the present invention, an image display apparatus includes a liquid crystal panel having a liquid crystal layer disposed between a pair of substrates, and an optical compensation plate pair including a first optical compensation plate and a second optical compensation plate, the first optical compensation plate being formed of a negative uniaxial crystal and the second optical compensation plate being formed of a positive uniaxial crystal, wherein an optical phase difference caused by a difference in thickness between the first optical compensation plate and the second optical compensation plate cancels an optical phase difference generated by the liquid crystal panel.

In the image display apparatus having the configuration described above, a combination of a first optical compensation plate, which is formed of a negative uniaxial crystal and which serves as a negative C-plate, and a second optical compensation plate, which is formed of a positive uniaxial crystal and which serves as a positive C-plate, provides optical compensation of a liquid crystal panel. In other words, an optical phase difference generated by the liquid crystal panel is canceled using an optical phase difference caused by a difference in thickness between the first optical compensation plate and the second optical compensation plate. For example, when the liquid crystal panel is modeled as a positive C-plate, it may be difficult in practice to compensate it only by using the first optical compensation plate because the first optical compensation plate is too thin. However, since an optical phase difference caused by a difference in thickness between the first optical compensation plate and the second optical compensation plate is utilized, it is possible to perform optical compensation of the liquid crystal panel while guaranteeing the practically acceptable thickness of the first optical compensation plate and the second optical compensation plate. In addition, each of the first optical compensation plate and the second optical compensation plate is formed of a uniaxial crystal. Thus, the plates are formed with the optical axes of the crystals inclined, which can support the pretilt angle at which the liquid crystal is aligned in the liquid crystal panel without inclining the plates.

According to an embodiment of the present invention, therefore, an optical compensation plate pair constructed by combining a first optical compensation plate formed of a negative uniaxial crystal and a second optical compensation plate formed of a positive uniaxial crystal is used to perform optical compensation of a liquid crystal panel. Therefore, regardless of whether the liquid crystal panel is a TN liquid crystal panel or a VA liquid crystal panel, increased contrast can be achieved to provide desired image quality by using optical compensation of the liquid crystal panel. In addition, even in this case, the practically acceptable thickness of the first optical compensation plate and the second optical compensation plate can be guaranteed. Furthermore, it is not necessary to incline the first optical compensation plate and the second optical compensation plate to support the pretilt angle at which the liquid crystal is aligned. A compact apparatus configuration and ease of mass production can therefore be achieved.

BRIEF DESCRIPTION OF THE DRAWINGS

FIG. 8 is a diagram showing an example of a specific method for creating an optical compensation plate;

FIG. 11 is a schematic diagram showing another example structure of a main part of a liquid crystal projector apparatus according to an embodiment of the present invention;

DESCRIPTION OF THE PREFERRED EMBODIMENTS

An image display apparatus and an optical compensation device according to an embodiment of the present invention will now be described with reference to the drawings.

First, a description will be given of a schematic structure of a liquid crystal projector apparatus, which is a specific example of an image display apparatus according to an embodiment of the present invention. A liquid crystal projector apparatus including liquid crystal panels individually corresponding to red (R), green (G), and blue (B) colors, called a three-plate liquid crystal projector apparatus, is widely available.

Figure 1:
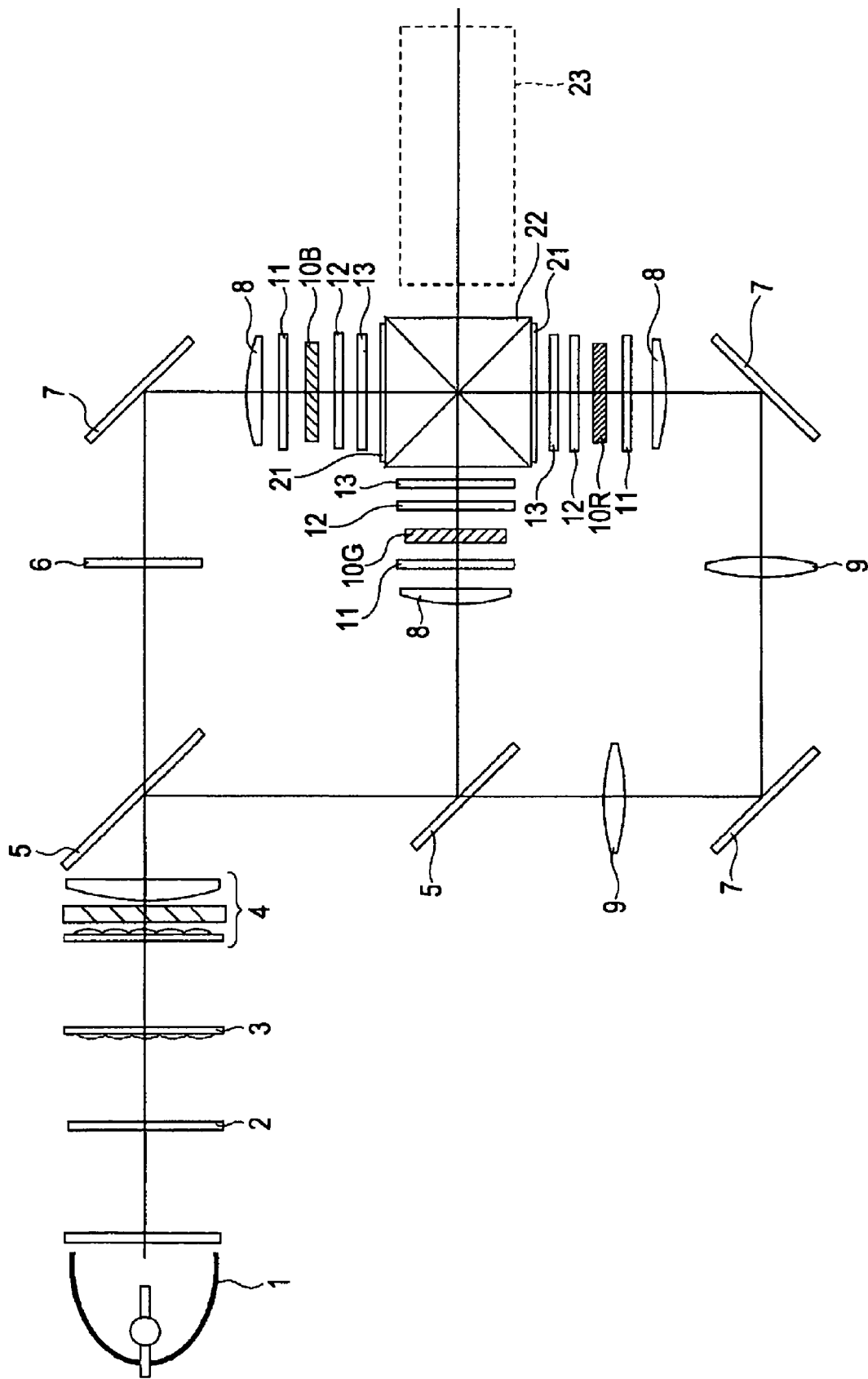
FIG. 1 is a schematic diagram schematically showing an example structure of a three-plate liquid crystal projector apparatus.

FIG. 1 is a schematic diagram schematically showing an example structure of a three-plate liquid crystal projector apparatus.

As shown in the example shown in FIG. 1, in the liquid crystal projector apparatus, light exited from a light source 1 travels through a filter 2 configured to block infrared radiation or ultraviolet radiation, a fly eye lens 3, and a PS separator/combiner 4 configured to convert unpolarized waves into polarized waves, and is then directed to a dichroic mirror 5 configured to reflect only light in a specific wavelength band. The dichroic mirror 5 separates the light into R, G, and B color light components. The color light components pass through a filter 6 configured to absorb ultraviolet radiation, as necessary, total reflection mirrors 7, condenser lenses 8, relay lenses 9, and any other suitable element as appropriate, and are incident on liquid crystal panels 10R, 10G, and 10B provided for the R, G, and B colors, respectively. After the color light components are modulated in accordance with video signals in the liquid crystal panels 10R, 10G, and 10B, the optically modulated color light components are directed to a dichroic prism 22 through ½ wavelength films 21, if necessary, and are combined, followed by enlargement and projection using a projector lens 23. In the liquid crystal projector apparatus, a color image is displayed on a screen accordingly.

Each of the liquid crystal panels 10R, 10G, and 10B is provided with an incident-side polarizing plate 11, an optical compensation plate pair 12, and an exit-side polarizing plate 13. The respective color light components transmitted through the incident-side polarizing plates 11 are incident on the liquid crystal panels 10R, 10G, and 10B, and the color light components optically modulated in the liquid crystal panels 10R, 10G, and 10B are transmitted through the optical compensation plate pairs 12 and the exit-side polarizing plates 13.

A structure of a main part in the liquid crystal projector apparatus will now be described.

Figure 2:
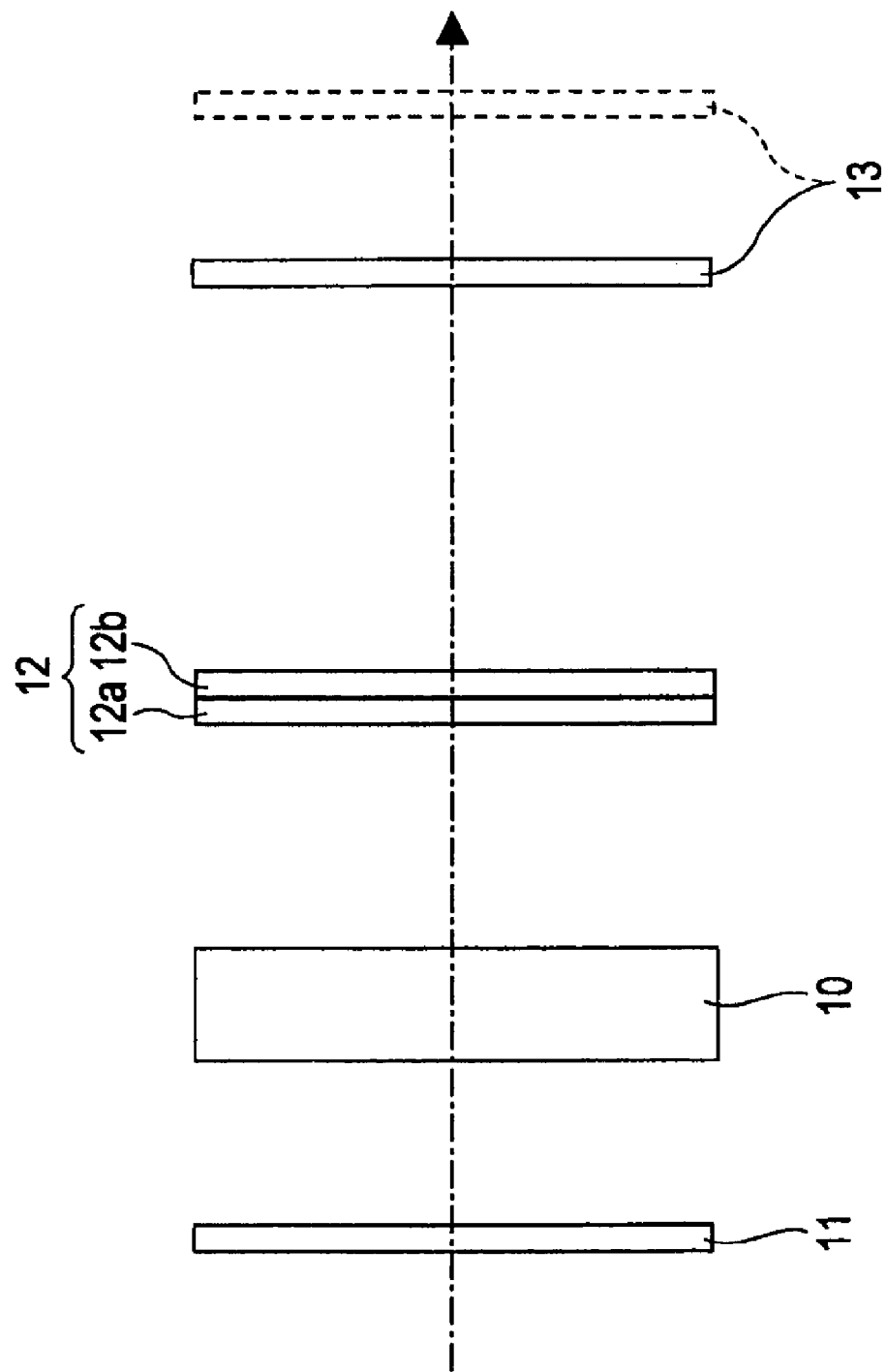
FIG. 2 is a schematic diagram showing an example structure of a main part of a liquid crystal projector apparatus according to an embodiment of the present invention.

FIG. 2 is a schematic diagram showing an example structure of the main part of the liquid crystal projector apparatus. In the example shown in FIG. 2, each of portions including the incident-side polarizing plates 11, the liquid crystal panels 10R, 10G, and 10B, the optical compensation plate pairs 12, and the exit-side polarizing plates 13 is shown in an enlarged scale.

As shown in the example shown in FIG. 2, on the optical path of each of the RGB color light components, a corresponding one of the liquid crystal panels 10R, 10G, and 10B (hereinafter referred to simply as a "liquid crystal panel 10") serving as an optical modulator and the optical compensation plate pair 12 are arranged between the incident-side polarizing plate 11 and the exit-side polarizing plate 13 which have cross-Nicol arrangement (i.e., having polarization directions perpendicular to each other) so that the optical compensation plate pair 12 may be located at the light-exit side. A plurality of exit-side polarizing plates 13 may be provided. The incident-side polarizing plate 11 and the exit-side polarizing plate or plates 13 may be organic polarizer plates or inorganic polarizer plates. As compared to organic polarizer plates, inorganic polarizer plates can reduce the deterioration of properties even when used in a liquid crystal projector apparatus in which the amount of light from the light source 1 is large, and provides longer lifetime and higher reliability.

The liquid crystal panel 10 has a liquid crystal layer disposed between a pair of substrates. The alignment of liquid crystal in the liquid crystal layer is varied in accordance with a voltage applied thereto to allow the liquid crystal panel 10 to function as an optical modulator for transmitted light.

The liquid crystal panel 10 may be made of VA liquid crystal. The VA liquid crystal is designed to operate in a vertical alignment mode. When no voltage is applied, liquid crystal is aligned perpendicularly to the substrates, and the liquid crystal is inclined with respect to the normal to the substrates when a voltage is applied. In actuality, however, the liquid crystal is aligned at a pretilt angle of about several degrees, rather than aligned completely perpendicularly to the substrates, even when no voltage is applied. That is, the liquid crystal panel 10 is configured such that liquid crystal molecules are inclined at a predetermined pretilt angle under no voltage application.

As is common in the art, the liquid crystal panel 10 including the VA liquid crystal behaves as a positive C-plate. The positive C-plate refers to a medium having an in-plane refractive index which is isotropic and having a large refractive index in a thickness direction thereof.

The optical compensation plate pair 12 is designed to provide optical compensation of the liquid crystal panel 10 to prevent light leakage in the black display state in the liquid crystal panel 10.

The optical compensation plate pair 12 includes a first optical compensation plate 12a composed of a negative uniaxial crystal and a second optical compensation plate 12b composed of a positive uniaxial crystal. The optical compensation plate pair 12 is configured such that an optical phase difference caused by the difference in thickness between the first optical compensation plate 12a and the second optical compensation plate 12b cancels an optical phase difference generated by the liquid crystal panel 10.

The negative uniaxial crystal is a crystal having a negative uniaxial optical anisotropy, and a specific example thereof is sapphire. The first optical compensation plate 12a formed of such a negative uniaxial crystal serves as a negative C-plate. The negative C-plate refers to a medium having an in-plane refractive index which is isotropic and having a small refractive index in a thickness direction thereof.

The positive uniaxial crystal, on the other hand, is a crystal having a positive uniaxial optical anisotropy, and a specific example thereof is quartz. The second optical compensation plate 12b formed of such a positive uniaxial crystal serves as a positive C-plate.

That is, the optical compensation plate pair 12 is constructed by combining the first optical compensation plate 12a, which is composed of a negative uniaxial crystal and which serves as a negative C-plate, and the second optical compensation plate 12b, which is composed of a positive uniaxial crystal and which serves as a positive C-plate. Because of the difference in thickness between the first optical compensation plate 12a and the second optical compensation plate 12b, the optical compensation plate pair 12 behaves as a negative C-plate as a whole.

The first optical compensation plate 12a and the second optical compensation plate 12b may be arranged integrally so that a light-exit surface of the first optical compensation plate 12a and a light-incident surface of the second optical compensation plate 12b can be brought into contract with each other.

Furthermore, since the liquid crystal molecules in the liquid crystal layer of the liquid crystal panel 10 are inclined at a predetermined pretilt angle, the first optical compensation plate 12a and the second optical compensation plate 12b may be configured with the optical axes thereof being inclined in a direction which coincides with the inclination direction of the pretilt angle, which will be described in detail below.

The effects of the liquid crystal projector apparatus having the structure described above, in particular, the main part thereof, i.e., the optical compensation plate pair 12, will now be described. The optical compensation plate pair 12 is an implementation of an optical compensation device according to an embodiment of the present invention.

Figure 3:
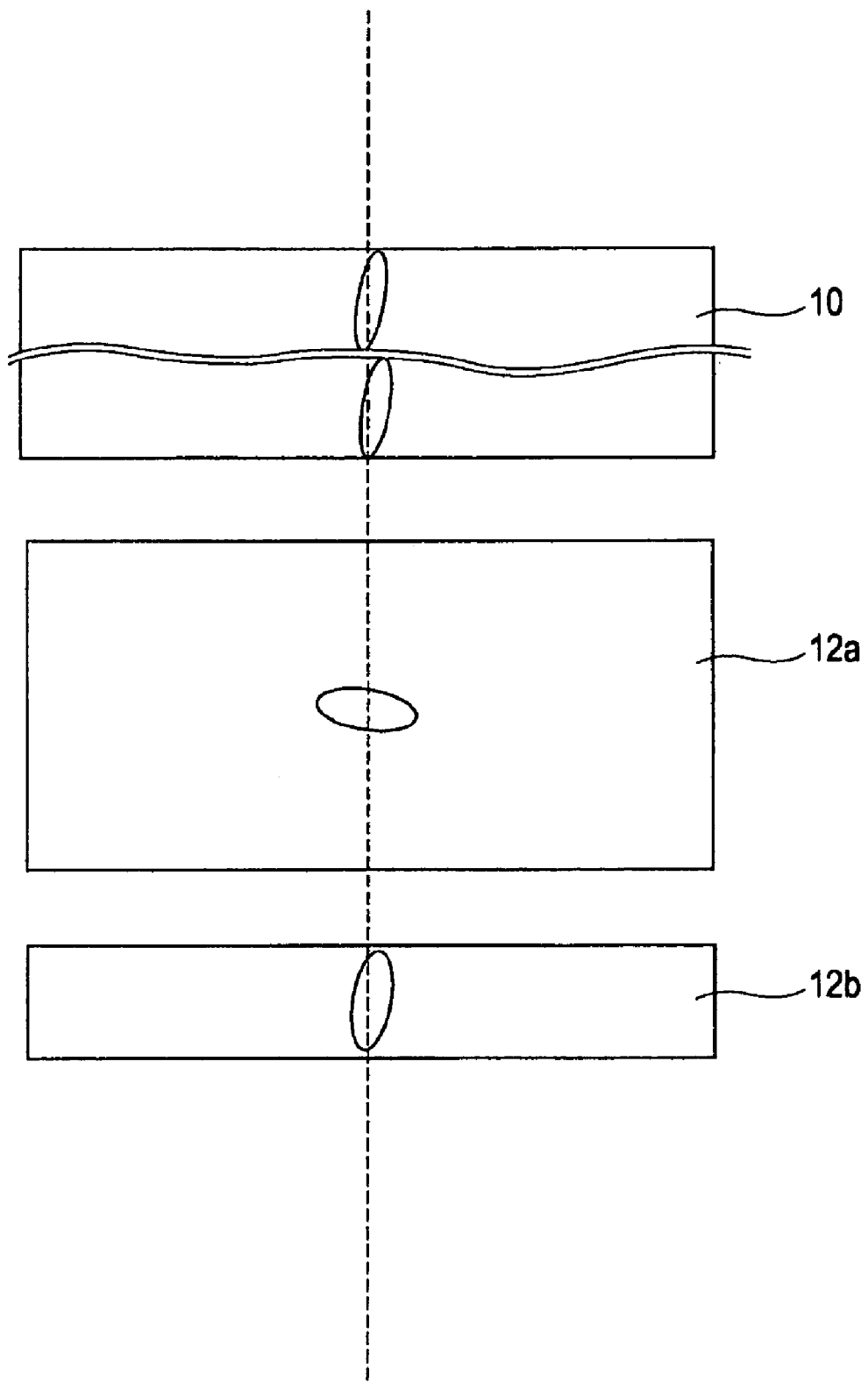
FIG. 3 is a diagram schematically showing beneficial effects of an optical compensation device according to an embodiment of the present invention.

FIG. 3 is a diagram schematically showing beneficial effects of an optical compensation device according to an embodiment of the present invention. More specifically, FIG. 3 is a diagram schematically showing the effect of refractive-index ellipsoids of the liquid crystal panel 10, the effect of a refractive-index ellipsoid of the first optical compensation plate 12a, and the effect of a refractive-index ellipsoid of the second optical compensation plate 12b.

The liquid crystal panel 10 is a VA liquid crystal panel in which the liquid crystal layer operates in the vertical alignment mode, and can be modeled as a positive uniaxial crystal. In other words, the VA liquid crystal layer which is inclined at the pretilt angle in the no applied voltage state is an inclined positive C-plate.

The sapphire plate forming the first optical compensation plate 12a is made of a negative uniaxial crystal. That is, the sapphire plate serves as a negative C-plate that causes a phase difference opposite in sign to that of the VA liquid crystal when a light ray passes therethrough. When used with the optical axis inclined, the sapphire plate serves as an inclined negative C-plate.

The quartz plate forming the second optical compensation plate 12b is made of a positive uniaxial crystal. When used with the optical axis inclined, the quartz plate serves as an inclined positive C-plate.

Accordingly, when the optical axes of the liquid crystal panel 10, the first optical compensation plate 12a, and the second optical compensation plate 12b are inclined in substantially the same direction, phase differences generated by the liquid crystal panel 10 and the second optical compensation plate 12b which are positive C-plates are the same in sign while a phase difference generated by the first optical compensation plate 12a which is a negative C-plate is opposite in sign. The thicknesses of the liquid crystal panel 10, the first optical compensation plate 12a, and the second optical compensation plate 12b are adjusted so that the sum of the magnitudes of the phase differences generated by the liquid crystal panel 10 and the second optical compensation plate 12b is equal to the magnitude of the phase difference generated by the first optical compensation plate 12a to prevent a phase shift between the incident-side polarizing plate 11 and the exit-side polarizing plate or plates 13 which are in the cross-Nicol relationship. This allows the phase difference generated by the liquid crystal panel 10 to be canceled by a phase difference generated by the difference in thickness between the first optical compensation plate 12a and the second optical compensation plate 12b.

Adjusting the thicknesses of the first optical compensation plate 12a and the second optical compensation plate 12b in substantially the same direction as the pretilt direction of the liquid crystal panel 10 allows the first optical compensation plate 12a and the second optical compensation plate 12b to behave as negative C-plates because of the difference in thickness therebetween. As a result, the phase difference generated by the liquid crystal panel 10 is canceled.

To help more easily understand this, a description will be given using models.

Figure 4:
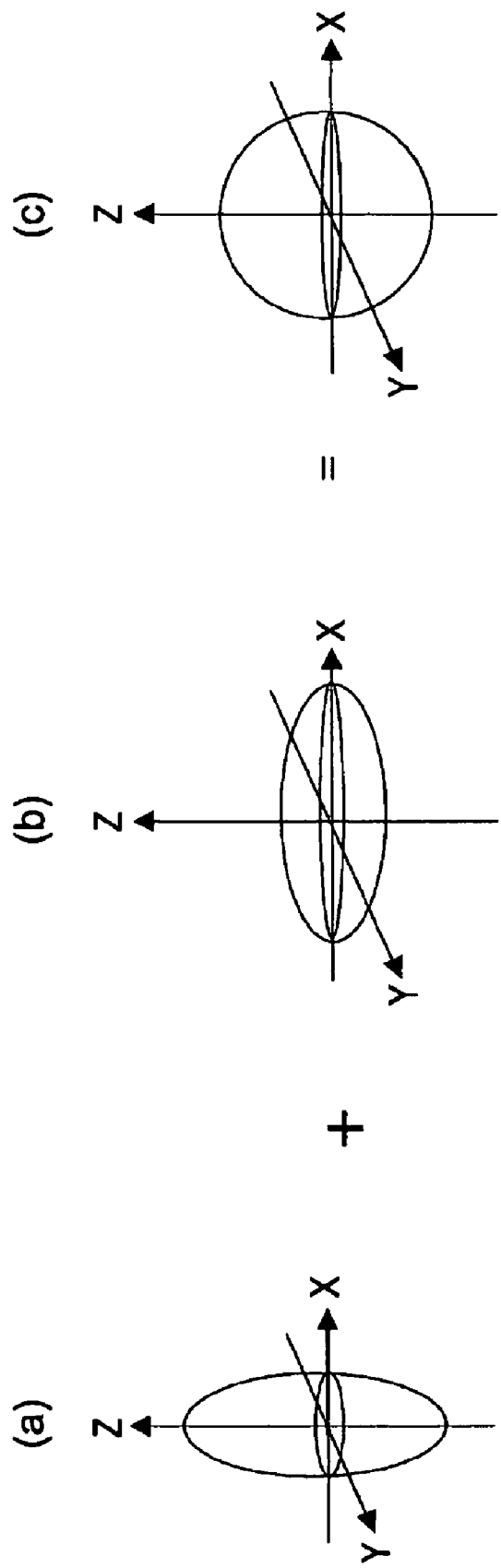
FIG. 4 is a diagram showing a first specific exemplary model of optical compensation.

FIG. 4 is a diagram showing a first specific exemplary model of optical compensation.

In FIG. 4, part (a) shows a refractive-index ellipsoid of a positive uniaxial crystal, in which ordinary ray refractive indices no in the X-axis and Y-axis directions are equal to each other while an extraordinary ray refractive index ne in the Z-axis (optical axis) direction is greater than the ordinary ray refractive indices no (no<ne). In FIG. 4, part (b) shows a refractive-index ellipsoid of a negative uniaxial crystal, in which the ordinary ray refractive indices no in the X-axis and Y-axis directions are equal to each other while the extraordinary ray refractive index ne in the Z-axis direction is smaller than the ordinary ray refractive indices no (no>ne). Adding together the refractive-index ellipsoids shown in parts (a) and (b) of FIG. 4 yields an apparently isotropic refractive-index ellipsoid shown in part (c) of FIG. 4. In this case, the ordinary ray refractive index and the extraordinary ray refractive index are equal to each other (no=ne) for light from any direction, and no phase differences occur. Respective phase difference amounts are determined by Δn (difference between ne and no)×thickness, where Δn is defined by the value of property. Thus, the phase difference amounts can be determined by adjusting the thicknesses.

Figure 5:
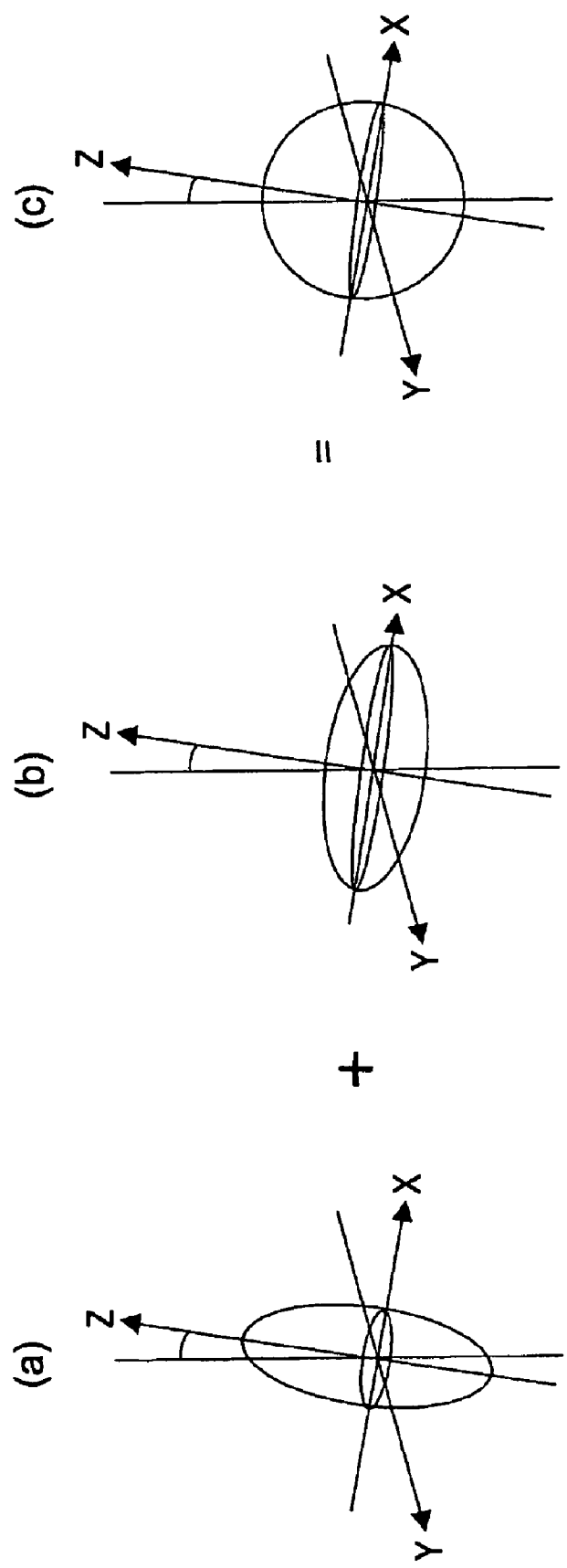
FIG. 5 is a diagram showing a second specific exemplary model of optical compensation.

FIG. 5 is a diagram showing a second specific exemplary model of optical compensation. In the example shown in FIG. 5, the Z axis is inclined with respect to the Z axis of the model shown in FIG. 4.

In FIG. 5, part (a) shows a refractive-index ellipsoid of a positive uniaxial crystal with the Z axis being inclined at a given angle. This is equivalent to the VA liquid crystal layer which is inclined at the pretilt angle in the no applied voltage state. In FIG. 5, part (b) shows a refractive-index ellipsoid of a negative uniaxial crystal with the Z axis being inclined at a given angle. This is equivalent to the first optical compensation plate 12a which is arranged with the optical axis inclined. Therefore, even when the Z axis is inclined, adding together the refractive-index ellipsoids shown in parts (a) and (b) of FIG. 5 yields an apparently isotropic refractive-index ellipsoid shown in part (c) of FIG. 5. The respective phase differences can thus be canceled.

Figure 6:
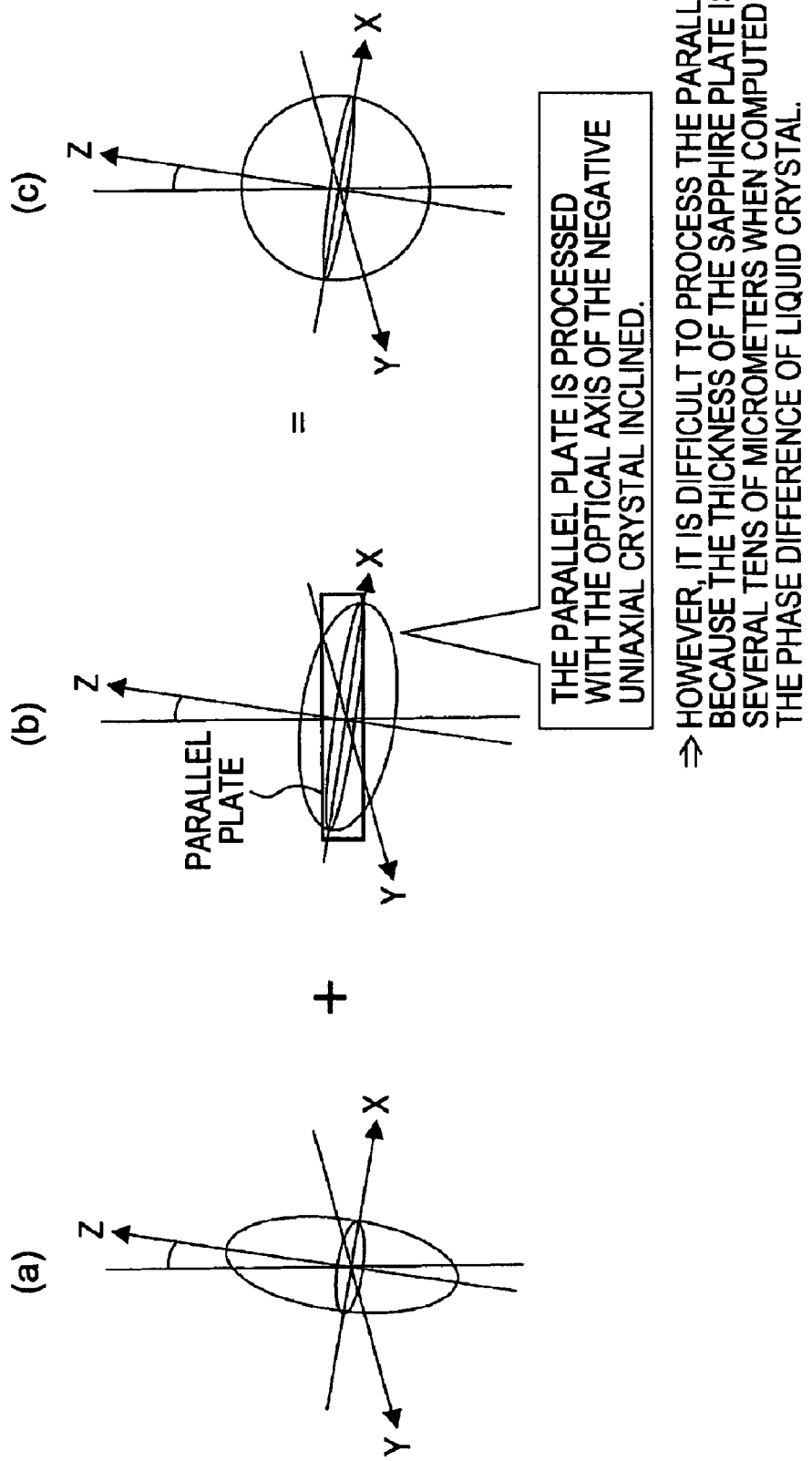
FIG. 6 is a diagram showing a third specific exemplary model of optical compensation.

FIG. 6 is a diagram showing a third specific exemplary model of optical compensation. The example shown in FIG. 6 illustrates a concept of cutting a parallel plate which serves as a compensation plate from the state as shown in part (b) of FIG. 5 in which the optical axis is inclined in the model shown in FIG. 5.

As shown in the example shown in FIG. 6, if the optical axis is inclined in the plane of the compensation plate that is cut as a parallel plate, it is not necessary to incline the compensation plate when it is mounted in the liquid crystal projector apparatus. Therefore, advantageously, a reduction in the size of the liquid crystal projector apparatus (or a reduction in the space for the liquid crystal projector apparatus) can be achieved. In addition, there is no concern about astigmatism.

However, it is difficult to accomplish this only with a compensation plate which is a negative C-plate because the thickness of the compensation plate formed of a negative uniaxial crystal is on the order of several tens of micrometers (μm). The compensation plate is too thin to form, process, and handle the compensation plate.

This is because the optical compensation plate pair 12 is constructed by combining the first optical compensation plate 12a, which is formed of a negative uniaxial crystal and which serves as a negative C-plate, and the second optical compensation plate 12b, which is formed of a positive uniaxial crystal and which serves as a positive C-plate.

Figure 7:
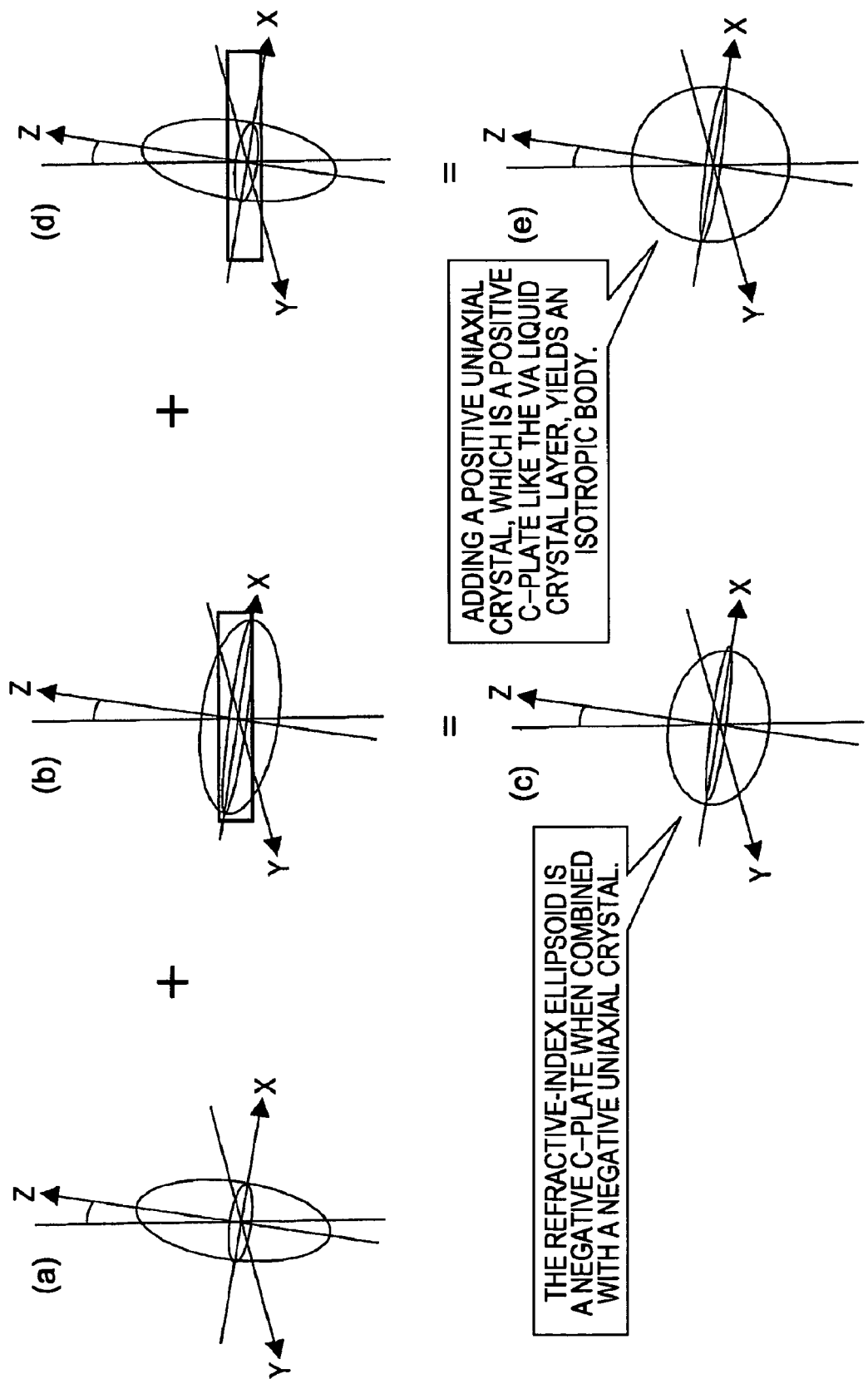
FIG. 7 is a diagram showing a fourth specific exemplary model of optical compensation.

FIG. 7 is a diagram showing a fourth specific exemplary model of optical compensation.

As in FIGS. 5 and 6, also in FIG. 7, part (a) shows a refractive-index ellipsoid with the VA liquid crystal layer inclined, and part (b) shows a refractive-index ellipsoid of an inclined negative uniaxial crystal. For example, it is assumed that the thickness of a compensation plate formed of the negative uniaxial crystal shown in part (b) of FIG. 7 is set on the order of several hundreds of micrometers (μm), which may cause no problem in the processing thereof. In this case, adding together the refractive-ellipsoids shown in parts (a) and (b) of FIG. 7 yields a refractive-index ellipsoid which is apparently negative C-plate as shown in part (c) of FIG. 7 because a phase difference amount generated by the negative uniaxial crystal shown in part (b) of FIG. 7 is greater than a phase difference amount generated by the liquid crystal layer shown in (a) of FIG. 7. In order to obtain an isotropic refractive-index ellipsoid, it is necessary to additionally provide a refractive-index ellipsoid of a positive C-plate. This is because the optical compensation plate pair 12 is constructed by combining a refractive-index ellipsoid of a positive uniaxial crystal as shown in part (d) of FIG. 7. That is, the thickness of the compensation plate formed of a positive uniaxial crystal shown in part (d) of FIG. 7 is set so that the phase difference shown in part (c) of FIG. 7 can be canceled. Therefore, as shown in part (e) of FIG. 7, an apparently isotropic refractive-index ellipsoid is obtained.

FIG. 8 is a diagram showing an example of a specific method for creating an optical compensation plate.

In FIG. 8, part (a) schematically shows a uniaxial crystal. Sapphire and quartz, which are specific examples of uniaxial crystals, are trigonal in a precise sense. In a broader sense, sapphire and quartz are hexagonal. In the hexagonal system, the c axis is an optical axis, and crystal axes a1, a2, and a3 are present. In order to incline the optical axis of an optical compensation plate at θ°, a parallel plate that is inclined at θ° with respect to a plane (c plane) perpendicular to the c axis may be cut. As shown in part (a) of FIG. 8, for example, if the parallel plate is cut to be shaped into a rectangle having a short side parallel to the a axes, as shown in part (b) of FIG. 8, a long side thereof is parallel to an m' axis that is obtained by projecting an m axis into a plane of the parallel plate. In the parallel plate of this state, the optical axis (the c axis) is oriented to be inclined at θ° toward the m' axis. If a long side parallel to the m' axis is set as a reference plane, the alignment direction of the liquid crystal layer is a direction inclined at 45° with respect to the reference plane. In order to incline the optical axis in the same direction as that of the pretilt angle of the liquid crystal layer, a rectangular plate having a reference plane further inclined at 45° with respect to the reference plane of the parallel plate may be cut. A finally produced plate is oriented in a manner shown in part (c) of FIG. 8. Therefore, an optical compensation plate having an optical axis inclined at θ° in the direction inclined at 45° with respect to the reference plane is produced.

Figure 9A:
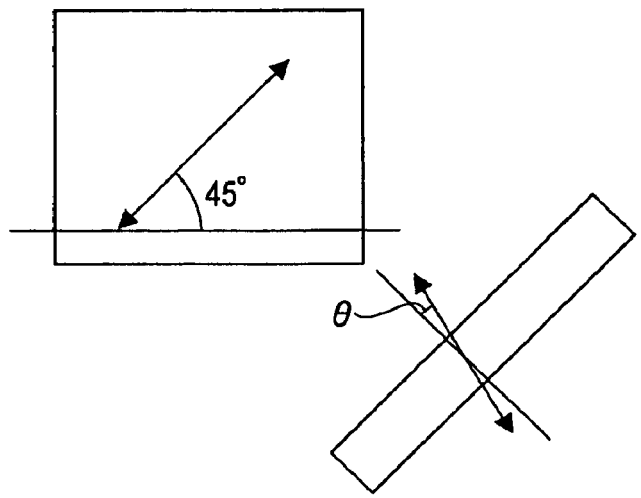
FIGS. 9A and 9B are diagrams showing an example structure of an optical compensation plate produced by the procedure shown in FIG. 8.
Figure 9B:
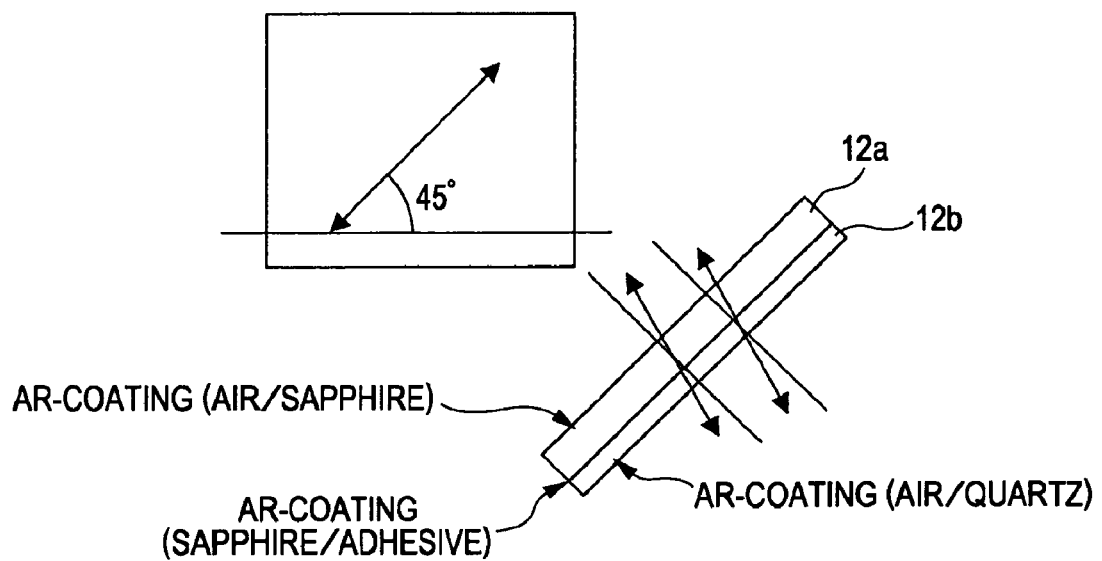

FIGS. 9A and 9B are diagrams showing an example structure of an optical compensation plate produced by the procedure shown in FIG. 8. FIG. 9A shows a pretilt direction of liquid crystal molecules, and FIG. 9B shows an optical axis direction of the optical compensation plate.

For example, as shown in FIG. 9A, the pretilt direction of the liquid crystal layer of the liquid crystal panel 10 is inclined at θ° in the direction inclined at 45° with respect to the reference plane. In this case, in order to produce the optical compensation plate pair 12 formed of a combination of the first optical compensation plate 12a and the second optical compensation plate 12b, a sapphire plate formed of a negative uniaxial crystal, which forms the first optical compensation plate 12a, and a quartz plate formed of a positive uniaxial crystal, which forms the second optical compensation plate 12b, may be cut so that the optical axes of the sapphire and quartz plates are directed along the pretilt angle of the liquid crystal molecules, and processed into parallel plates. The cut parallel plates are bonded into a unitary assembly as shown in FIG. 9B. The parallel plates may be formed to have thicknesses of about several hundreds of micrometers (μm). By the virtue of the configuration in which a phase difference generated by the liquid crystal layer is canceled by a phase difference generated by the difference in thickness between the first optical compensation plate 12a and the second optical compensation plate 12b, as the thickness of one of them is increased, the thickness of the other is also increased. A thickness of several hundreds of micrometers (μm), which provides practical formation and processing as well as practical handling, is achieved.

Note that the liquid crystal layer of the liquid crystal panel 10, the sapphire plate formed of a negative uniaxial crystal, which forms the first optical compensation plate 12a, and the quartz plate formed of a positive uniaxial crystal, which forms the second optical compensation plate 12b, are different in refractive index wavelength dispersion. They are also different in the value of Δn (the difference between ne and no), which are determined by materials. Taking these conditions into account, it may be desirable that the first optical compensation plate 12a composed of sapphire and the second optical compensation plate 12b composed of quartz be designed so that the inclination angles of the optical axes are shifted by about several degrees (for example, about 1° to about 5°, more preferably, about 1° to about 3°) rather than being completely equal to the pretilt angle of the liquid crystal layer of the liquid crystal panel 10.

Furthermore, preferably, each of the first optical compensation plate 12a composed of sapphire and the second optical compensation plate 12b composed of quartz has an anti-reflection (AR) coating formed therein on a side in contact with air. The AR coatings can increase the transmittance.

Further, the refractive index of sapphire is about 1.77 and the refractive index of quartz is about 1.55. The refractive index of an adhesive adhering them is about 1.5. Since the difference in refractive index between the quartz and the adhesive is small, substantially no reflection occurs on the boundary therebetween. On the other hand, there is a large difference in refractive index between the sapphire and the adhesive, and reflection on the boundary therebetween can induce a reduction in transmittance. Therefore, preferably, an AR coating is also formed on a surface where the sapphire and the adhesive are in contact with each other.

Figure 10A:
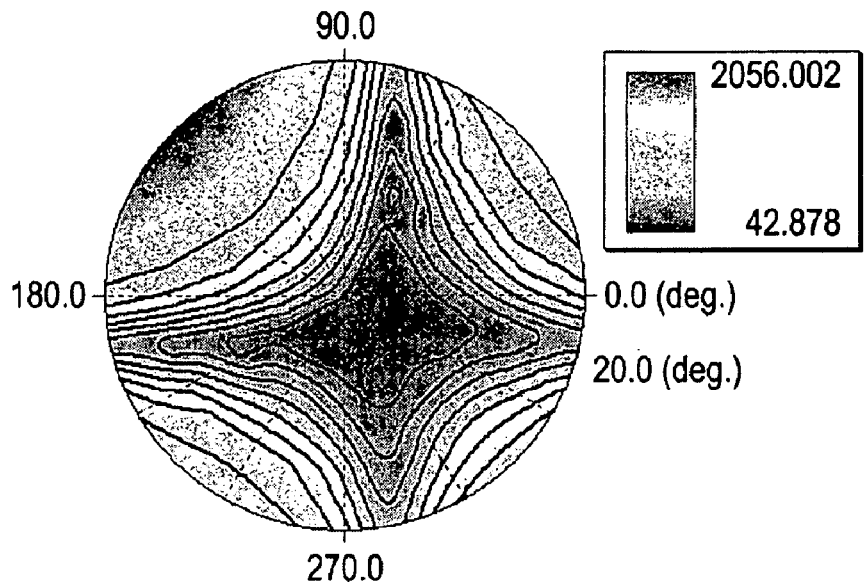
FIGS. 10A and 10B are diagrams showing a specific example of simulation results of viewing-angle characteristics for the optical system.
Figure 10B:
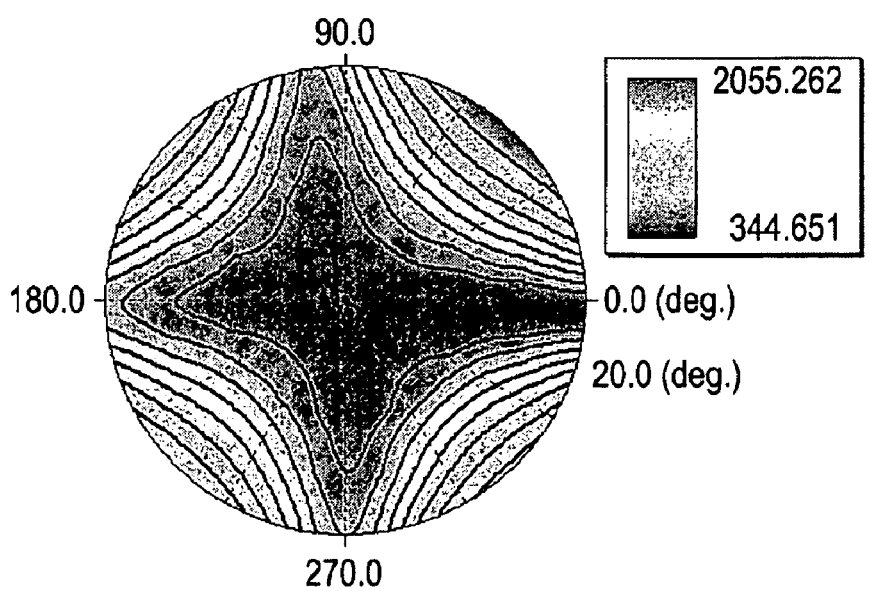

FIGS. 10A and 10B are diagrams showing a specific example of simulation results of viewing-angle characteristics for the optical system. In the example shown in FIGS. 10A and 10B, viewing-angle characteristics are represented by equal contrast ratio contours.

FIG. 10A shows a simulation result obtained when the optical compensation plate pair 12 formed of a combination of the first optical compensation plate 12a and the second optical compensation plate 12b was not used. As a result of the simulation of light having an incident angle of 0° to 20°, it is found that a portion with a contrast of 2000:1 or more is narrow and that the line widths decrease with the distance to the center. This implies that the larger the incident angle, the more rapidly the contrast decreases.

FIG. 10B shows a simulation result obtained when the optical compensation plate pair 12 formed of a combination of the first optical compensation plate 12a and the second optical compensation plate 12b was used. As compared with the simulation result shown in FIG. 10A, it is found that a portion with a contrast of 2000:1 or more is broad and that line widths gradually increase. That is, the use of the optical compensation plate pair 12 formed of a combination of the first optical compensation plate 12a and the second optical compensation plate 12b provides accurate compensation at an incident angle of about 0° to about 10°.

As described above, in the liquid crystal projector apparatus having the structure described above and the optical compensation plate pair 12 used in the liquid crystal projector apparatus, a combination of the first optical compensation plate 12a, which is formed of a negative uniaxial crystal and which serves as a negative C-plate, and the second optical compensation plate 12b, which is formed of a positive uniaxial crystal and which serves as a positive C-plate, allows optical compensation of the liquid crystal panel 10. That is, an optical phase difference caused by the difference in thickness between the first optical compensation plate 12a and the second optical compensation plate 12b is utilized to cancel an optical phase difference generated by the liquid crystal panel 10. With this configuration, regardless of whether the liquid crystal panel 10 is a TN liquid crystal panel or a VA liquid crystal panel, optical compensation of the liquid crystal panel 10 is achieved while the practically acceptable thickness of the first optical compensation plate 12a and the second optical compensation plate 12b is guaranteed. That is, in the case where the liquid crystal panel 10 is either a TN liquid crystal panel or a VA liquid crystal panel, optical compensation of the liquid crystal panel 10 using the optical compensation plate pair 12 can provide high-contrast image display using the liquid crystal panel 10 to achieve desired image quality.

In general, in a case where an optical compensation plate is used, it is necessary to perform in-plane rotation adjustment to find a darkest black area. A rotation adjustment mechanism used therefor is necessary and the rotation adjustment processing is time-consuming. The use of the optical compensation plate pair 12 having the structure described above, in contrast, does not involve the rotation adjustment of the optical compensation plate pair 12 alone because the sensitivity to in-plane rotation is low so that sufficient compensation effects can be achieved even with rotation at, for example, about ±5° to about 10°. That is, a mechanism for rotation adjustment or time-consuming rotation adjustment is not used for the optical compensation plate pair 12. Furthermore, as described below, the optical compensation plate pair 12 can be integrally formed with the polarizing plates 11 and 13, or can be integrally formed with the substrates of the liquid crystal panel 10 in an easy manner.

Furthermore, the optical compensation plate pair 12 provides optical compensation of the liquid crystal panel 10 so that light leakage during black display in the liquid crystal panel 10 can be prevented. This is also effective to eliminate or reduce non-uniformity in the black state.

In addition, each of the first optical compensation plate 12a and the second optical compensation plate 12b is formed of a uniaxial crystal. In a case where the liquid crystal molecules in the liquid crystal layer of the liquid crystal panel 10 are inclined at a predetermined pretilt angle, it is possible to incline the optical axes of the first optical compensation plate 12a and the second optical compensation plate 12b in a direction which coincides with the inclination direction of the pretilt angle. The first optical compensation plate 12a and the second optical compensation plate 12b are formed with the optical axes of the respective uniaxial crystals being inclined. This configuration can support the pretilt angle at which the liquid crystal is aligned in the liquid crystal panel 10 without inclining the first optical compensation plate 12a and the second optical compensation plate 12b. Therefore, even a configuration that may support the pretilt angle at which the liquid crystal is aligned does not involve the inclined arrangement of the first optical compensation plate 12a and the second optical compensation plate 12b. No large space is used for the arrangement and a reduction in the size of the liquid crystal projector apparatus can be easily implemented. Additionally, since the above-described mechanism involves no inclined arrangement, no astigmatism occurs.

As described above, furthermore, sapphire is used as a negative uniaxial crystal forming the first optical compensation plate 12a, and quartz is used as a positive uniaxial crystal forming the second optical compensation plate 12b. This can make optical compensation of the liquid crystal panel 10 feasible using the difference in thickness between the first optical compensation plate 12a and the second optical compensation plate 12b, and can facilitate obtaining the material of the first optical compensation plate 12a and the second optical compensation plate 12b and processing them, resulting in a reduction in the cost. The negative uniaxial crystal is not limited to sapphire and the positive uniaxial crystal is not limited to quartz. Any other uniaxial crystal may be used.

Furthermore, as described above, the first optical compensation plate 12a and the second optical compensation plate 12b of the optical compensation plate pair 12 may be integrally arranged. The integrated arrangement provides a reduction in space.

In an apparatus structure focusing on luminance, such as a liquid crystal projector apparatus, a microlens array may be provided on a light-incident side of the liquid crystal panel 10 in order to increase the effective numerical aperture. In such an apparatus structure, the angle of the light ray incident on the microlens array and the angle of the light ray transmitted through the microlens array vary.

An integrated assembly of the first optical compensation plate 12a and the second optical compensation plate 12b of the optical compensation plate pair 12 may be provided on the light-exit side of the liquid crystal panel 10. This allows the angle of the light ray that passes through the liquid crystal layer of the liquid crystal panel 10 after passing through the microlens array to coincide with the angle of the light ray that passes through the optical compensation plate pair 12. As a result, sufficient optical compensation effects can be achieved.

However, the first optical compensation plate 12a and the second optical compensation plate 12b of the optical compensation plate pair 12 may not necessarily be arranged integrally so as to be brought into contact with each other. Alternatively, the first optical compensation plate 12a and the second optical compensation plate 12b may be separately arranged.

An example structure in which the first optical compensation plate 12a and the second optical compensation plate 12b are separately arranged will now be described.

FIG. 11 is a schematic diagram showing another example structure of the main part of the liquid crystal projector apparatus. In the example shown in FIG. 11, like the example structure shown in FIG. 2, each of portions including the incident-side polarizing plate 11, the liquid crystal panels 10R, 10G, and 10B, the optical compensation plate pairs 12, and the exit-side polarizing plate 13 is shown in an enlarged scale.

Also in the example shown in FIG. 11, like the integrated arrangement described above (see FIG. 2), the liquid crystal panel 10 and the optical compensation plate pair 12 constructed by combining the first optical compensation plate 12a and the second optical compensation plate 12b are arranged between the incident-side polarizing plate 11 and the exit-side polarizing plate 13 which have cross-Nicol arrangement. A plurality of exit-side polarizing plates 13 may be provided.

Unlike the integrated arrangement described above, the first optical compensation plate 12a and the second optical compensation plate 12b are separately arranged. Specifically, the first optical compensation plate 12a formed of sapphire which is a negative uniaxial crystal is provided at the light-incident side of the liquid crystal panel 10, and the second optical compensation plate 12b formed of quartz which is a positive uniaxial crystal is provided at a light-exit side of the liquid crystal panel 10.

In this manner, even when the first optical compensation plate 12a and the second optical compensation plate 12b are separately arranged, an optical phase difference generated by the liquid crystal panel 10 is canceled using an optical phase difference caused by a difference in thickens between the first optical compensation plate 12a and the second optical compensation plate 12b. With this configuration, optical compensation of the liquid crystal panel 10 is achieved while the practically acceptable thickness of the first optical compensation plate 12a and the second optical compensation plate 12b is guaranteed. That is, high-contrast image display can be achieved using the liquid crystal panel 10 to provide desired image quality.

In a case where the first optical compensation plate 12a and the second optical compensation plate 12b are integrally or separately arranged, the arrangement order of the first optical compensation plate 12a, the second optical compensation plate 12b, and the liquid crystal panel 10 may be changed as necessary. In other words, the liquid crystal panel 10, the first optical compensation plate 12a composed of sapphire, and the second optical compensation plate 12b composed of quartz may be arranged in varying order on their optical path. As far as the difference in thickness between the first optical compensation plate 12a and the second optical compensation plate 12b is set so that an optical phase difference generated by the liquid crystal panel 10 can be canceled, similar technical advantages can be achieved regardless of the arrangement order.

The optical compensation plate pair 12 including the first optical compensation plate 12a and the second optical compensation plate 12b is arranged between the incident-side polarizing plate 11 and the exit-side polarizing plate 13 which are in the cross-Nicol relationship.

As is common to the art, sapphire which may form the first optical compensation plate 12a and quartz which may form the second optical compensation plate 12b are high in thermal conductivity and exhibit the heat dissipation effect. Hence, it is possible to use sapphire or quartz as a base material of the incident-side polarizing plate 11 or the exit-side polarizing plate 13.

Accordingly, the base material of each of the polarizing plates 11 and 13 may have the function of the first optical compensation plate 12a or the second optical compensation plate 12b. Thus, each of the polarizing plates 11 and 13 may be configured to also function as the first optical compensation plate 12a or the second optical compensation plate 12b in the optical compensation plate pair 12.

Specifically, as shown in FIG. 11, sapphire which is a negative uniaxial crystal may be used as the base material of the incident-side polarizing plate 11, and quartz which is a positive uniaxial crystal may be used as the base material of the exit-side polarizing plate 13. Those base materials may have polarizing layers formed thereon or may be formed with polarizing films to implement the functions of the polarizing plates 11 and 13. Further, the difference in thickness between the base material of the incident-side polarizing plate 11 and the base material of the exit-side polarizing plate 13 is set so that an optical phase difference generated by the liquid crystal panel 10 can be canceled. This allows the base materials to function as the first optical compensation plate 12a and the second optical compensation plate 12b.

This structure ensures the technical effect of providing optical compensation of the liquid crystal panel 10 and further allows the base materials of the polarizing plates 11 and 13 to play a role of optical compensation. The number of parts used can be reduced as compared with the incorporation of an additional optical compensation plate, which is also advantageous in terms of the cost of the apparatus.

Both the base materials of the polarizing plates 11 and 13 may not necessarily play the role of optical compensation. That is, one of them may play the role.

Furthermore, at least one of the first optical compensation plate 12a and the second optical compensation plate 12b of the optical compensation plate pair 12 may be arranged integrally with the substrates of the liquid crystal panel 10. Since the liquid crystal panel 10 is configured such that a liquid crystal layer is disposed between a pair of substrates, at least one of the sets of the substrates and the first optical compensation plate 12a and the second optical compensation plate 12b may be formed into an integrated assembly.

With the use of the integrated arrangement, there is no gap between the liquid crystal panel 10 and the first optical compensation plate 12a or the second optical compensation plate 12b. This can facilitate a reduction in the size of the apparatus structure.

Figure 12:
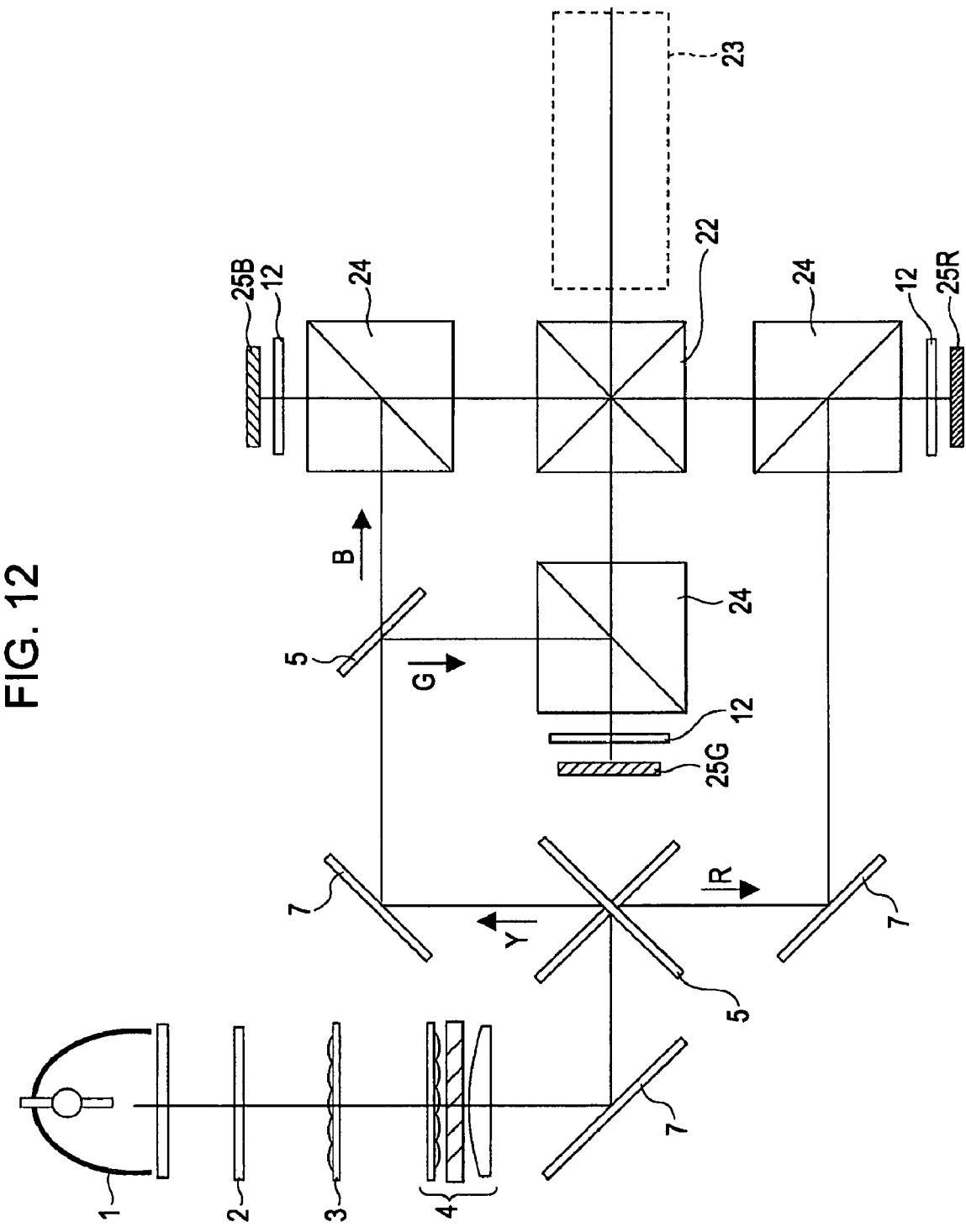
FIG. 12 is a schematic diagram schematically showing another example structure of a three-plate liquid crystal projector apparatus.

FIG. 12 is a schematic diagram schematically showing another example structure of a three-plate liquid crystal projector apparatus. In the example shown in FIG. 12, an example structure of a liquid crystal projector apparatus including a reflective liquid crystal panel is schematically illustrated.

Also in the liquid crystal projector apparatus of FIG. 12, as with a liquid crystal projector apparatus including a transmissive liquid crystal panel (see FIG. 1), light exited from a light source 1 travels through a filter 2, a fly eye lens 3, and a PS separator/combiner 4, and is then directed to a dichroic mirror 5 into R, G, and B color light components. The color light components are incident on liquid crystal panels 25R, 25G, and 25B provided for R, G, and B colors, respectively, using total reflection mirrors 7 and polarizing beam splitters (PBSs) 24, as necessary. Thereafter, optical modulation is performed in accordance with video signals in the liquid crystal panels 25R, 25G, and 25B. The optically modulated color light components are combined by a dichroic prism 22 and the result is enlarged and projected using a projector lens 23. In the liquid crystal projector apparatus, a color image is displayed on a screen accordingly.

Figure 13:
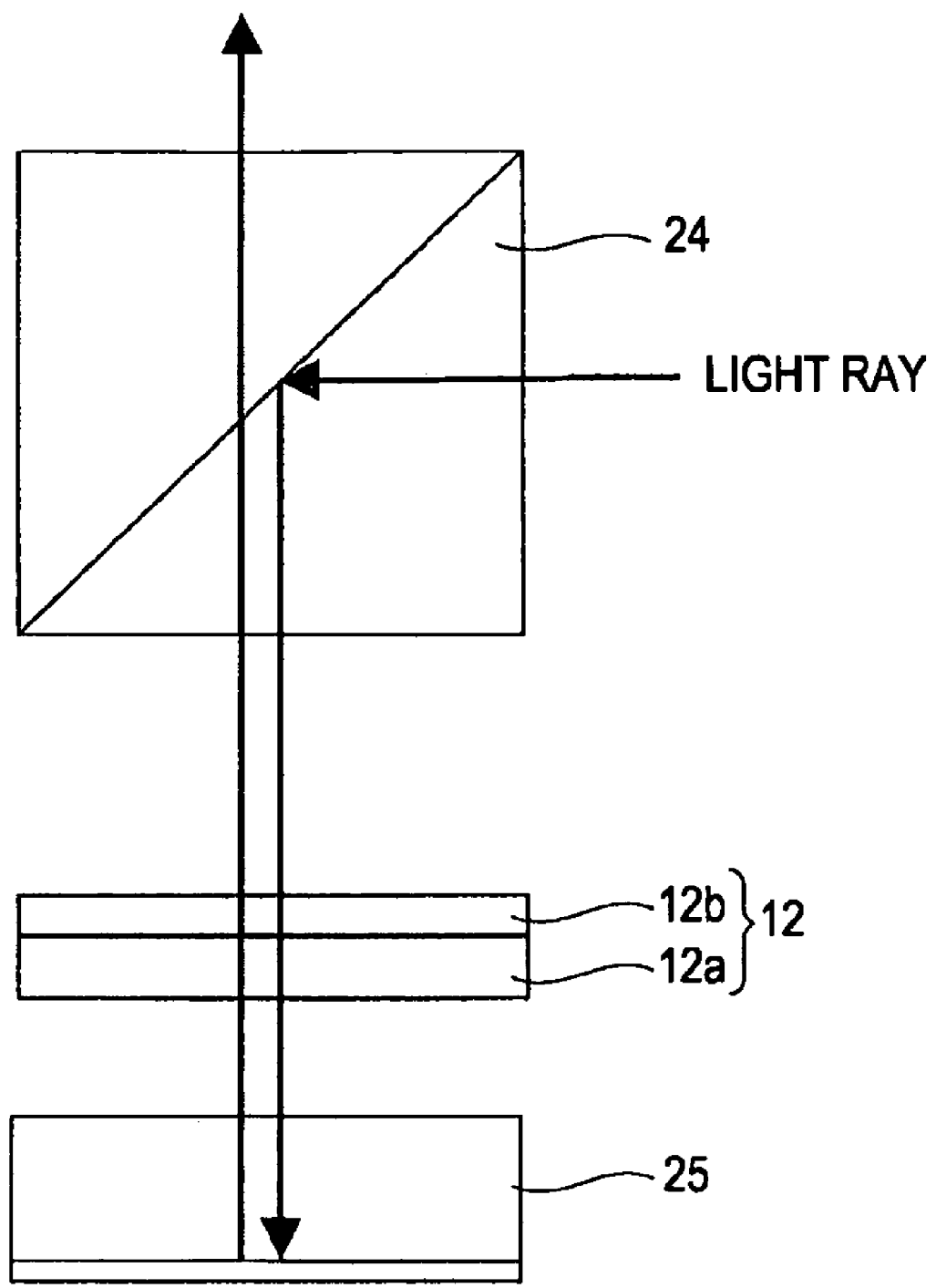
FIG. 13 is a schematic diagram showing still another example structure of a main part of a liquid crystal projector apparatus according to an embodiment of the present invention and showing an example structure of a main part of the liquid crystal projector apparatus shown in FIG. 12.

FIG. 13 is a schematic diagram showing an example structure of a main part of the liquid crystal projector apparatus shown in FIG. 12. In the example shown in FIG. 13, each of portions including the PBSs 24, the optical compensation plate pairs 12, and the liquid crystal panels 25R, 25G, and 25B (hereinafter referred to simply as a "liquid crystal panel 25") is shown in an enlarged scale.

In an exemplary optical system shown in FIG. 13, light incident on the PBS 24 in the S-polarization state is reflected from a film surface, and enters the liquid crystal panel 25, which is reflective, through the optical compensation plate pair 12. The light is reflected from a reflection surface of the liquid crystal panel 25 and directed back along the traveling path to the PBS 24 through the optical compensation plate pair 12.

Also in the optical system having the structure described above, an optical phase difference generated by the liquid crystal panel 25 is canceled using an optical phase difference caused by a difference in thickness between the first optical compensation plate 12a and the second optical compensation plate 12b in the optical compensation plate pair 12. This achieves optical compensation of the liquid crystal panel 25 while guaranteeing the practically acceptable thickness of the first optical compensation plate 12a and the second optical compensation plate 12b. Therefore, high-contrast image display using the liquid crystal panel 25 can be achieved to provide desired image quality.

The reflective liquid crystal panel 25 may be configured such that characteristics similar to those obtained when light passes once through the transmissive liquid crystal panel 10 can be obtained when light reciprocates through the liquid crystal layer. Thus, the amount of the phase difference generated by the liquid crystal layer can be calculated by adding together the amounts generated by the reciprocation.

Accordingly, even in a liquid crystal projector apparatus including the reflective liquid crystal panel 25, as in a liquid crystal projector apparatus including the transmissive liquid crystal panel 10, an optical phase difference of the liquid crystal panel 25 can be canceled using the optical compensation plate pair 12 formed of a combination of the first optical compensation plate 12a and the second optical compensation plate 12b. Since a light ray also travels through the optical compensation plate pair 12 reciprocally, which means twice, the designed thickness values of the first optical compensation plate 12a and the second optical compensation plate 12b may be reduced to substantially a half those of the transmissive liquid crystal panel 10.

While the foregoing embodiment has been described as a preferred specific exemplary embodiment of the present invention, the embodiment is not to be construed as limiting the present invention, and a variety of modifications may be made without departing from the scope of the invention.

In the present embodiment, an image display apparatus has been described in the context of a liquid crystal projector apparatus by way of example. Any other image display apparatus including a liquid crystal panel may be used, such as a television apparatus, a monitor device of a desktop personal computer, a notebook-size personal computer, an image pickup apparatus including a liquid crystal display device, such as a video camera or a digital still camera, a personal digital assistant (PDA), and a mobile phone, as well as a wide variety of electronic apparatuses including an image display apparatus having a liquid crystal panel.

It should be understood by those skilled in the art that various modifications, combinations, sub-combinations and alterations may occur depending on design requirements and other factors insofar as they are within the scope of the appended claims or the equivalents thereof.

What is claimed is:

1. An image display apparatus comprising:
    a liquid crystal panel having a liquid crystal layer disposed between a pair of substrates; and
    an optical compensation plate pair including a first optical compensation plate and a second optical compensation plate, the first optical compensation plate being a C-plate formed of a negative uniaxial crystal and the second optical compensation plate being a C-plate formed of a positive uniaxial crystal,
    wherein,
        the first optical compensation plate has a first optical phase difference,
        the second optical compensation plate has a second optical phase difference,
        the liquid crystal panel has a third optical phase difference,
        a fourth optical phase difference caused by a difference in thickness between the first optical compensation plate and the second optical compensation plate cancels the third optical phase difference of the liquid crystal panel,
        a thickness of the liquid crystal panel, the first optical compensation plate, and the second compensation plate are such that a sum of magnitudes of the third optical phase difference of the liquid crystal panel and the second optical phase difference of the compensation plate is equal to a magnitude of the first optical phase difference of the first optical compensation plate, and
        at least one of the first optical compensation plate and the second optical compensation plate has an optical axis inclined in a direction which coincides with an inclination direction of a predetermined pretilt angle of liquid crystal molecules of the liquid crystal layer.

2. The image display apparatus according to claim 1, wherein the liquid crystal panel operates in a vertical alignment mode and is configured such that liquid crystal molecules in the liquid crystal layer are inclined at the predetermined pretilt angle when no voltage is applied.

3. The image display apparatus according to claim 2, wherein the negative uniaxial crystal is sapphire.

4. The image display apparatus according to claim 2, wherein the positive uniaxial crystal is quartz.

5. The image display apparatus according to claim 1, wherein the optical compensation plate pair is configured such that the first optical compensation plate and the second optical compensation plate are integrally arranged.

6. The image display apparatus according to claim 1, wherein the optical compensation plate pair is configured such that the first optical compensation plate and the second optical compensation plate are separately arranged.

7. The image display apparatus according to claim 1, further comprising:
    a polarizing plate disposed on a light-incident side or light-exit side of the liquid crystal panel,
    wherein the polarizing plate has a function of one of the first optical compensation plate and the second optical compensation plate in the optical compensation plate pair.

8. The image display apparatus according to claim 1, wherein the optical compensation plate pair is configured such that at least one of the first optical compensation plate and the second optical compensation plate is arranged integrally with the substrates of the liquid crystal panel.

9. An optical compensation device comprising:
    an optical compensation plate pair used with a liquid crystal panel having a liquid crystal layer disposed between a pair of substrates, the optical compensation plate pair including a first optical compensation plate and a second optical compensation plate, the first optical compensation plate being a C-plate formed of a negative uniaxial crystal and the second optical compensation plate being a C-plate formed of a positive uniaxial crystal,
    wherein,
        the first optical compensation plate has a first optical phase difference,
        the second optical compensation plate has a second optical phase difference,
        the liquid crystal panel has a third optical phase difference,
        a fourth optical phase difference caused by a difference in thickness between the first optical compensation plate and the second optical compensation plate cancels a third optical phase difference of the liquid crystal panel,
        a thickness of the liquid crystal panel, the first optical compensation plate, and the second compensation plate are such that a sum of magnitudes of the third optical phase difference of the liquid crystal panel and the second optical phase difference of the compensation plate is equal to a magnitude of the first optical phase difference of the first optical compensation plate, and
        at least one of the first optical compensation plate and the second optical compensation plate has an optical axis inclined in a direction which coincides with an inclination direction of a predetermined pretilt angle of liquid crystal molecules of the liquid crystal layer.

10. The image display apparatus according to claim 1, wherein the first optical compensation plate and the second optical compensation plate are provided on a same side of the liquid crystal panel.

* * * * *